United States Patent
Lubben (10) Patent No.: US 10,077,087 B2
(45) Date of Patent: Sep. 18, 2018

(54) VARIABLE TREAD WIDTH TRACK WORK VEHICLE

(71) Applicant: Deere & Company, Moline, IL (US)

(72) Inventor: Jeff Lubben, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 14 days.

(21) Appl. No.: 15/238,061

(22) Filed: Aug. 16, 2016

(65) Prior Publication Data

US 2018/0050746 A1  Feb. 22, 2018

(51) Int. Cl.
*B62D 55/084* (2006.01)
*B62D 55/065* (2006.01)

(52) U.S. Cl.
CPC .......... *B62D 55/084* (2013.01); *B62D 55/065* (2013.01)

(58) Field of Classification Search
CPC ..... B62D 55/084; B62D 55/065; B62D 55/08
See application file for complete search history.

(56) References Cited

U.S. PATENT DOCUMENTS

| | | | |
|---|---|---|---|
| 2,618,349 A | 11/1952 | Ludema | |
| 3,700,115 A * | 10/1972 | Johnson | B62D 55/084 180/9.48 |
| 3,712,398 A * | 1/1973 | Althaus | B62D 55/084 180/9.48 |
| 3,757,881 A * | 9/1973 | Short | B62D 55/084 180/9.1 |
| 3,998,286 A | 12/1976 | Ponikelsky et al. | |
| 5,072,800 A * | 12/1991 | Price | B62D 55/08 180/9.48 |
| 5,598,896 A * | 2/1997 | Haest | B62D 55/084 180/9.48 |
| 5,622,234 A | 4/1997 | Nagorcka et al. | |
| 6,007,166 A | 12/1999 | Tucker et al. | |
| 6,176,334 B1 | 1/2001 | Lorenzen | |
| 6,318,484 B2 | 11/2001 | Lykken et al. | |
| 6,374,933 B1 * | 4/2002 | Ruppert, Jr. | B62D 21/14 180/9.44 |
| 6,715,576 B2 | 4/2004 | Filho | |

(Continued)

FOREIGN PATENT DOCUMENTS

DE   3442319 A1   6/1986
EP   1442968 A1   4/2004

(Continued)

*Primary Examiner* — Joseph M Rocca
*Assistant Examiner* — Michael R Stabley
(74) *Attorney, Agent, or Firm* — Klintworth & Rozenblat IP LLP; Steven J. Wietrzny (57) ABSTRACT

A variable tread width system is disclosed for a track work vehicle. The track work vehicle has a differential gear case and at least one axle shaft. The variable tread width system includes a drive wheel removably coupled to the axle shaft to receive a torque to drive the track. The drive wheel is movable relative to the axle shaft between a first orientation and a second orientation. The system also includes a saddle assembly coupled to the differential gear case. The saddle assembly includes at least one rail movable relative to the differential gear case, and the saddle assembly is movable independently of the drive wheel. The drive wheel cooperates with the saddle assembly to define a plurality of tread widths for the track work vehicle.

18 Claims, 9 Drawing Sheets

(56) References Cited

U.S. PATENT DOCUMENTS

| | | |
|---|---|---|
| 7,373,999 B2 | 5/2008 | Haringer |
| 7,451,840 B2 | 11/2008 | Radke et al. |
| 8,347,991 B2 | 1/2013 | Zuchoski et al. |
| 8,376,078 B2 | 2/2013 | Hiddema |
| 8,662,216 B2 | 3/2014 | Roucka |
| 9,303,692 B2 | 4/2016 | Lubben et al. |
| 2001/0004951 A1 | 6/2001 | Pertusi |
| 2009/0229894 A1* | 9/2009 | Roucka ............. B62D 49/0678 180/9.48 |
| 2009/0308669 A1 | 12/2009 | Vos et al. |
| 2009/0321151 A1 | 12/2009 | Archambault et al. |
| 2014/0224555 A1 | 8/2014 | Qian et al. |
| 2014/0239670 A1 | 8/2014 | Tochigi |
| 2014/0292064 A1 | 10/2014 | Hannukalnen et al. |
| 2015/0102586 A1 | 4/2015 | Tollefsrud et al. |
| 2015/0354149 A1* | 12/2015 | Dahm ................ E01C 19/4886 404/98 |

FOREIGN PATENT DOCUMENTS

| | | |
|---|---|---|
| EP | 2660130 A1 | 6/2013 |
| FR | 2416825 A1 | 9/1979 |

\* cited by examiner

VARIABLE TREAD WIDTH TRACK WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and to track work vehicles having an adjustable or variable tread width.

BACKGROUND OF THE DISCLOSURE

Various work vehicles, such as tractors, include tracks that provide additional traction to enable the tractors to more easily move through rough or muddy fields. In certain instances, due to the nature of the field or particular operation on the field, it may be desirable to adjust a tread width between tracks on the tractor. Generally, the adjustment of the tread width requires disassembling a gear box and inserting one or more spacers and shafts, and a particular kit of spacers and shafts is required for each tread width. The disassembly of the gear box is time consuming and may reduce productivity of the tractor. Moreover, the numerous kits required to adjust between various tread widths are costly, and require the operator to store the various kits when not in use.

SUMMARY OF THE DISCLOSURE

The disclosure provides a work vehicle having a variable tread width track that is adjustable without requiring numerous kits or disassembly of a gear box of the work vehicle.

In one aspect the disclosure provides a variable tread width system for a track work vehicle. The track work vehicle has a differential gear case and at least one axle shaft. The variable tread width system includes a drive wheel removably coupled to the axle shaft to receive a torque to drive the track. The drive wheel is movable relative to the axle shaft between a first orientation and a second orientation. The system also includes a saddle assembly coupled to the differential gear case. The saddle assembly includes at least one rail movable relative to the differential gear case, and the saddle assembly is movable independently of the drive wheel. The drive wheel cooperates with the saddle assembly to define a plurality of tread widths for the track work vehicle.

In another aspect the disclosure provides a variable tread width system for a track work vehicle. The track work vehicle has a differential gear case and at least one axle shaft. The variable tread width system includes a drive wheel removably coupled to the axle shaft to receive a torque to drive the track. The system also includes a saddle assembly coupled to the differential gear case. The saddle assembly includes at least one rail movable relative to the differential gear case to adjust a tread width of the work vehicle. The saddle assembly is movable independently of the drive wheel. The system includes an undercarriage assembly that guides the track about the drive wheel. The undercarriage assembly is pivotally mounted to the saddle assembly such that movement of the saddle assembly relative to the differential gear case moves the undercarriage assembly.

In yet another aspect the disclosure provides a variable tread width system for a track work vehicle. The track work vehicle has a differential gear case and at least one axle shaft. The variable tread width system includes a drive wheel coupled to the axle shaft to receive a torque to drive the track. The drive wheel is movable between a first orientation relative to the axle shaft and a reverse orientation relative to the axle shaft. The system also includes a saddle assembly coupled to the differential gear case. The saddle assembly includes a first rail spaced apart from a second rail. Each of the first rail and the second rail is movable relative to the differential gear case, and the saddle assembly is movable independently of the drive wheel. A movement of the saddle assembly relative to the differential gear case and a movement of the drive wheel relative to the axle shaft cooperates to define a plurality of tread widths for the track work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed variable width track system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

The following describes one or more example implementations of the disclosed system for a tread width system for adjusting a tread width of a work vehicle to various tread widths, as shown in the accompanying figures of the drawings described briefly above. Generally, the disclosed systems (and work vehicles in which they are implemented) provide for increased tread width by adjusting a saddle assembly, which is pivotally coupled to an undercarriage assembly, relative to a differential gear case of the work vehicle, and by also changing an orientation of a drive wheel coupled to an axle shaft of the work vehicle. In certain embodiments, the tread width is adjustable from about 72 inches to about 120 inches, and to various positions between 72 inches and 120 inches. By providing a tread width that is adjustable by moving the saddle assembly and changing an orientation of the drive wheel, the operator is able to adjust the tread width of the work vehicle to various positions without requiring disassembly of the differential gear case or requiring a kit of parts for each desired tread width, thereby reducing cost and improving productivity of the work vehicle.

The following description relates to a work vehicle as a tractor. Discussion herein may sometimes focus on the example application of a tractor having a track system that is adjustable to provide the variable tread width. It should be noted, however, that the present disclosure is not limited to the track system, but rather, any undercarriage assembly and drive wheel assembly may be moved according to the present teachings to change a tread width of a work vehicle.

In the example of the present disclosure, each track system of the work vehicle includes a drive wheel coupled to a hub pilot to form a drive wheel assembly, an undercarriage assembly, a saddle assembly and a track that is coupled about the drive wheel assembly and the undercarriage assembly, and is driven by the drive wheel. The undercarriage assembly is pivotally mounted to the saddle assembly, such that movement of the saddle assembly relative to the differential gear case results in a corresponding movement of the undercarriage assembly. In this example, the drive wheel is not fixedly mounted to the saddle assembly or the undercarriage assembly, such that the drive wheel is independently movable relative to both the saddle assembly and the undercarriage assembly. In certain embodiments, however, the drive wheel may be fixed to the saddle assembly and/or the undercarriage assembly, if desired. Generally, the saddle assembly is movable relative to the differential gear case via two rails, which are slidably received in corresponding channels that extend outwardly from the differential gear case. One or more mechanical fasteners are employed to fixedly couple the rails to the channels at a desired tread width. Thus, the length of the rails and the channels cooperate to define the various lengths of the tread widths for the work vehicle.

As the drive wheel assembly is not coupled to the saddle assembly or the undercarriage assembly, in this example, the operator moves the drive wheel and/or the hub pilot relative to the axle shaft to the desired orientation for the selected tread width. In certain embodiments, the drive wheel and hub pilot are coupled to the axle shaft of the differential gear case in a first orientation, and are rotatable about 180 degrees to be coupled to the axle shaft in a second, different or reverse orientation. It should be noted, however, that the drive wheel and the hub pilot can be coupled to the axle shaft in any number of orientations to facilitate the desired tread width.

Figure 1:
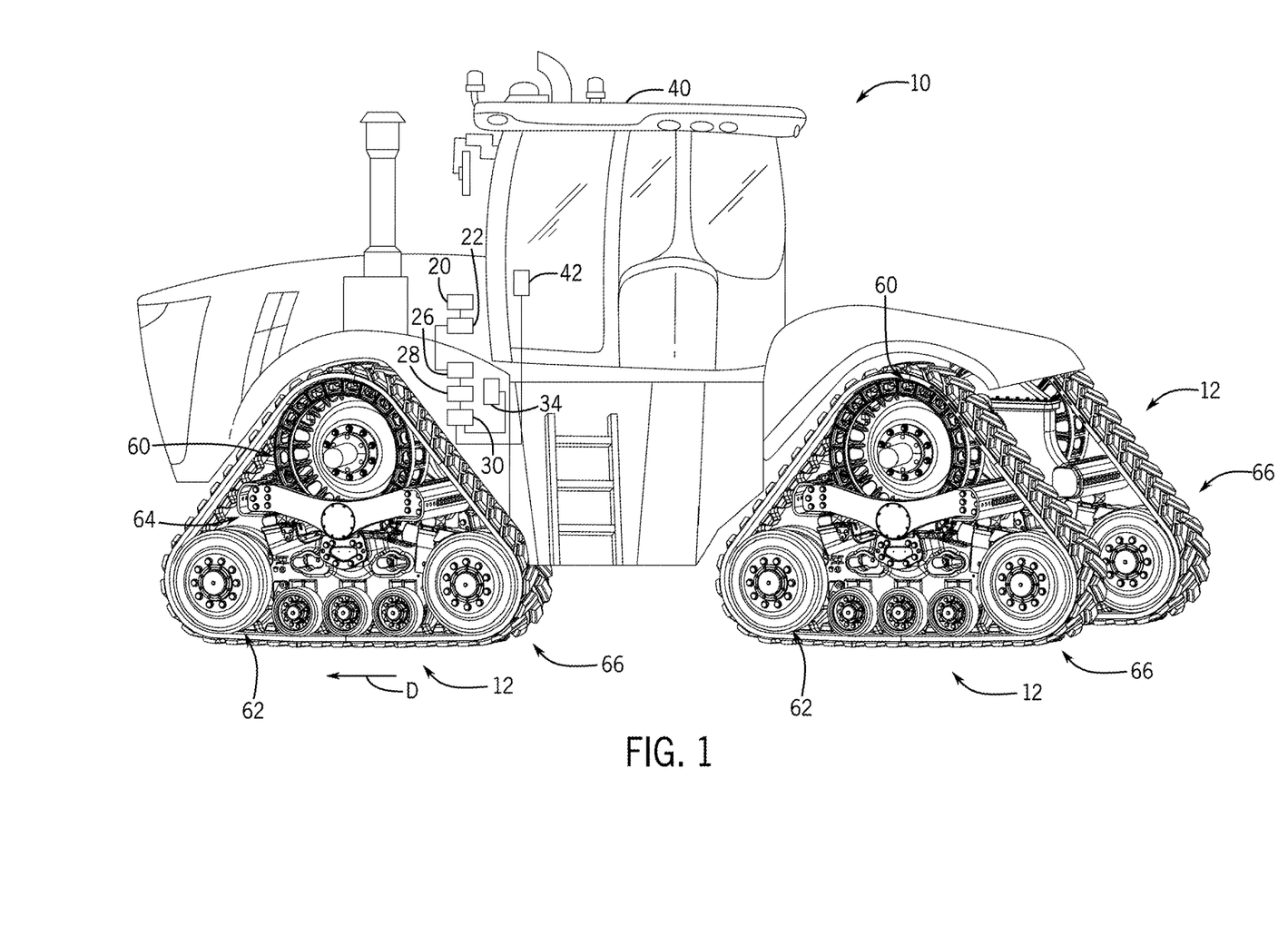
FIG. 1 is a perspective view of an example work vehicle in the form of a tractor, which includes a plurality of variable tread width track systems according to various embodiments of this disclosure.

As noted above, the system described herein may be employed with respect to a variety of work vehicles, including various agricultural or other work vehicles. In certain embodiments, the described system may be implemented with respect to a tractor. It will be understood, however, that the system disclosed herein may be used with various other work vehicles, such as a graders, excavators, etc. Referring to FIG. 1, a work vehicle, such as a tractor 10, is shown. As will be discussed, the tractor 10 includes a plurality of track systems 12, which are each adjustable to provide a variable tread width for the tractor 10.

The tractor 10 includes a source of propulsion, such as an engine 20. The engine 20 supplies power to a transmission 22. The transmission 22 transfers the power from the engine 20 to a suitable driveline coupled to one or more of the track systems 12 of the tractor 10 to enable the tractor 10 to move. In one example, the engine 20 is an internal combustion engine, such as a diesel engine, that is controlled by an engine control module. It should be noted that the use of an internal combustion engine is merely exemplary, as the propulsion device can be a fuel cell, electric motor, a hybrid-electric motor, etc.

The tractor 10 also includes one or more pumps 26, which may be driven by the engine 20 of the tractor 10. Flow from the pumps 26 may be routed through various control valves 28 and various conduits (e.g., flexible hoses and lines) to control various components associated with the tractor 10. Flow from the pumps 26 may also power various other components of the tractor 10. The flow from the pumps 26 may be controlled in various ways (e.g., through control of the various control valves 28 and/or a controller 30 associated with the tractor 10).

Generally, the controller 30 (or multiple controllers) may be provided, for control of various aspects of the operation of the tractor 10, in general. The controller 30 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 30 may be configured to execute various computational and control functionality with respect to the tractor 10 (or other machinery). In some embodiments, the controller 30 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 30 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 30 may be in electronic, hydraulic, mechanical, or other communication with various other systems or devices of the tractor 10 (or other machinery, such as an implement coupled to the tractor 10). For example, the controller 30 may be in electronic or hydraulic communication with various actuators, sensors, and other devices within (or outside of) the tractor 10, including various devices associated with the pumps 26, control valves 28, and so on. The controller 30 may communicate with other systems or devices (including other controllers, such as a controller associated with an implement) in various known ways, including via a CAN bus (not shown) of the tractor 10, via wireless or hydraulic communication means, or otherwise.

Various sensors may also be provided to observe various conditions associated with the tractor 10. In some embodiments, various sensors 34 (e.g., pressure, flow or other sensors) may be disposed near the pumps 26 and control valves 28, or elsewhere on the tractor 10. For example, sensors 34 observe a pressure associated with the pumps 26 and generate sensor signals based thereon.

Figure 2:
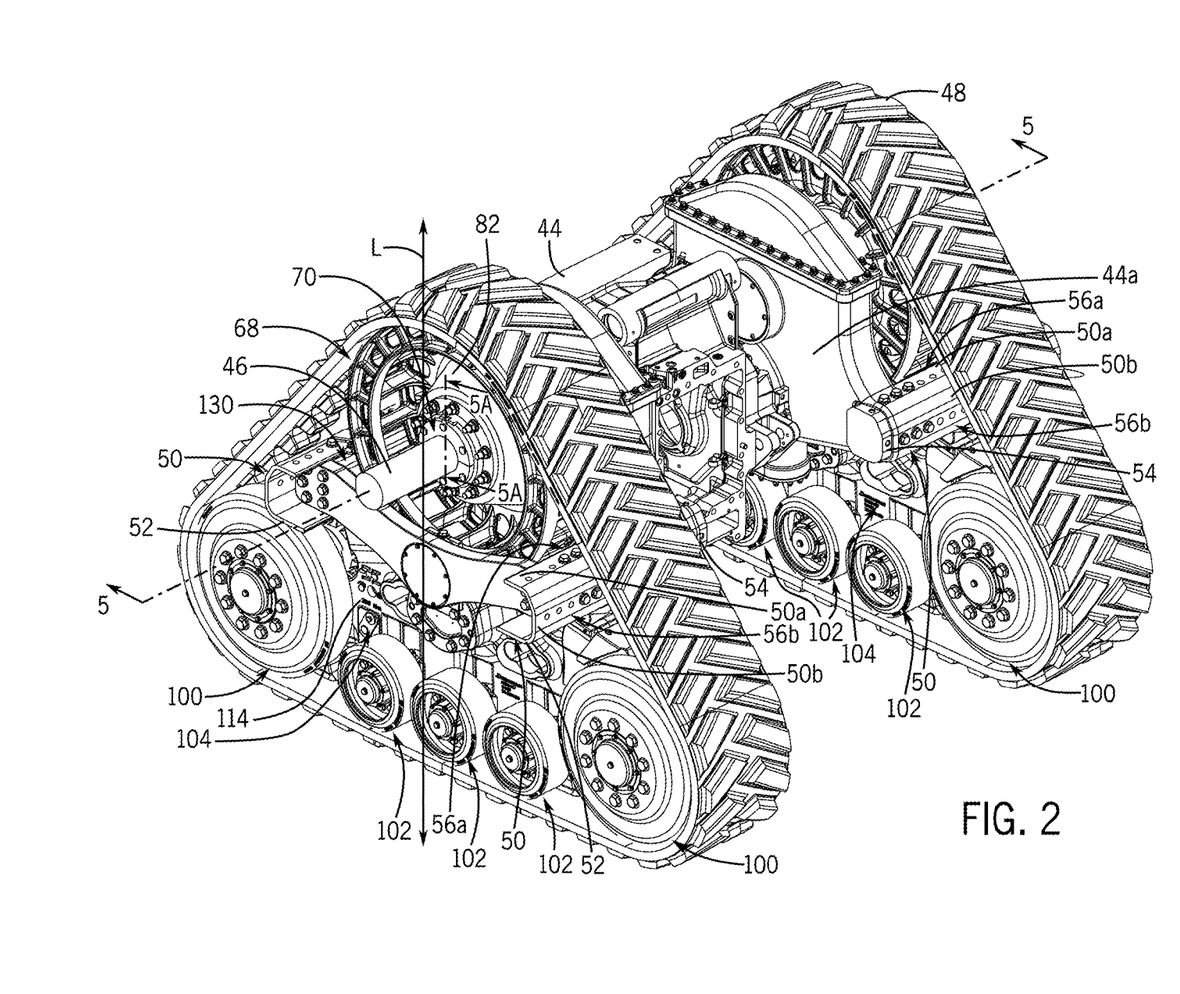
FIG. 2 is a perspective view of a pair of variable tread width track systems of the work vehicle of FIG. 1, which illustrates the pair of variable tread width track systems coupled to a differential gear case.

With reference to FIG. 2, the tractor 10 includes a cab 40. The cab 40 includes a human-machine interface 42. The controller 30 receives input commands and interfaces with the operator via the human-machine interface 42. The human-machine interface 42 may be configured in a variety of ways. In some embodiments, the human-machine interface 42 may include one or more joysticks, steering wheels, various switches or levers, one or more buttons, a touchscreen interface that may be overlaid on a display, a keyboard, a speaker, a microphone associated with a speech recognition system, or various other human-machine interface devices.

Figure 1A:
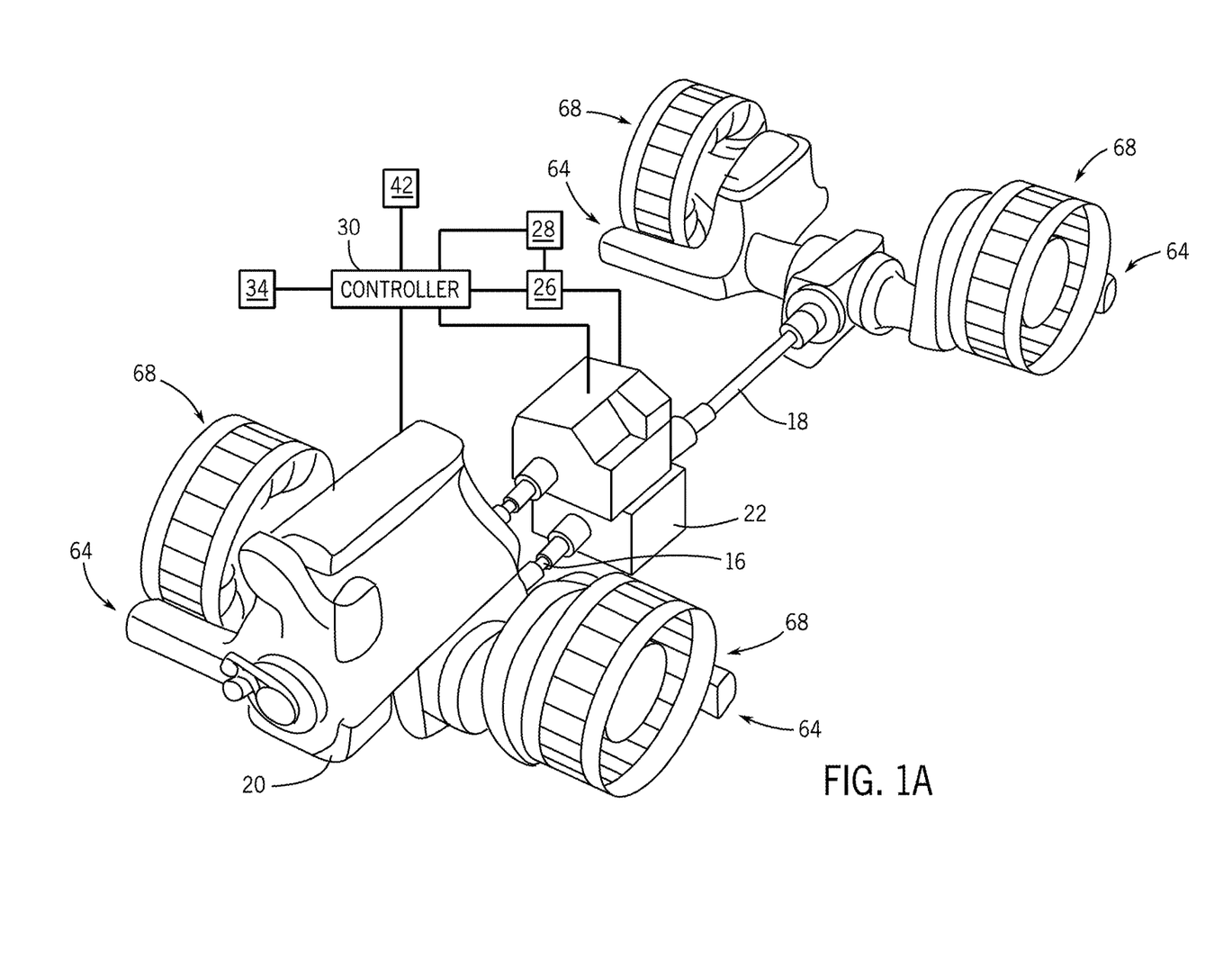
FIG. 1A is a schematic perspective view of a drive line for the work vehicle of FIG. 1, with a portion of each saddle assembly omitted for clarity.

As illustrated in FIG. 1A, the tractor 10 includes a pair of track systems 12 associated with a first or front axle assembly 16 of the tractor 10 in a forward driving direction D, and a pair of track systems 12 associated with a second or rear axle 18 of the tractor 10. It should be noted that while the tractor 10 is illustrated herein as comprising the plurality of track systems 12, it will be understood that the tractor 10 can include any number of track systems 12, such as one or two.

With reference to FIG. 2, a pair of the track systems 12 is shown. In this example, the track systems 12 are coupled to a differential gear case 44, which receives torque from the transmission 22 (FIG. 1). The differential gear case 44 is coupled to a frame of the tractor 10. The differential gear case 44 may include suitable gearing, which transfers the power from the transmission 22 to axle shafts 46, 48, respectively, to drive rotation of the track systems 12. The differential gear case 44 also includes one or more channels 50. The channels 50 can be coupled directly to the differential gear case 44, via one or more mechanical fasteners, or can be integrally formed with a portion of the differential gear case 44, such as a housing 44a of the differential gear case 44. It should be noted that while the housing 44a and the differential gear case 44 are illustrated herein as separate components, the housing 44a and the differential gear case 44 can comprise an integral component, with the channels 50 formed integrally with the differential gear case 44. The channels 50 are generally composed of a metal or metal alloy, and can be cast, stamped, etc. It should be understood that while the channels 50 are illustrated and described herein as being associated with or coupled to the differential gear case 44, the disclosure is not so limited. In this regard, the channels 50 can comprise structural members associated with a frame of the work vehicle, if desired.

Figure 3:
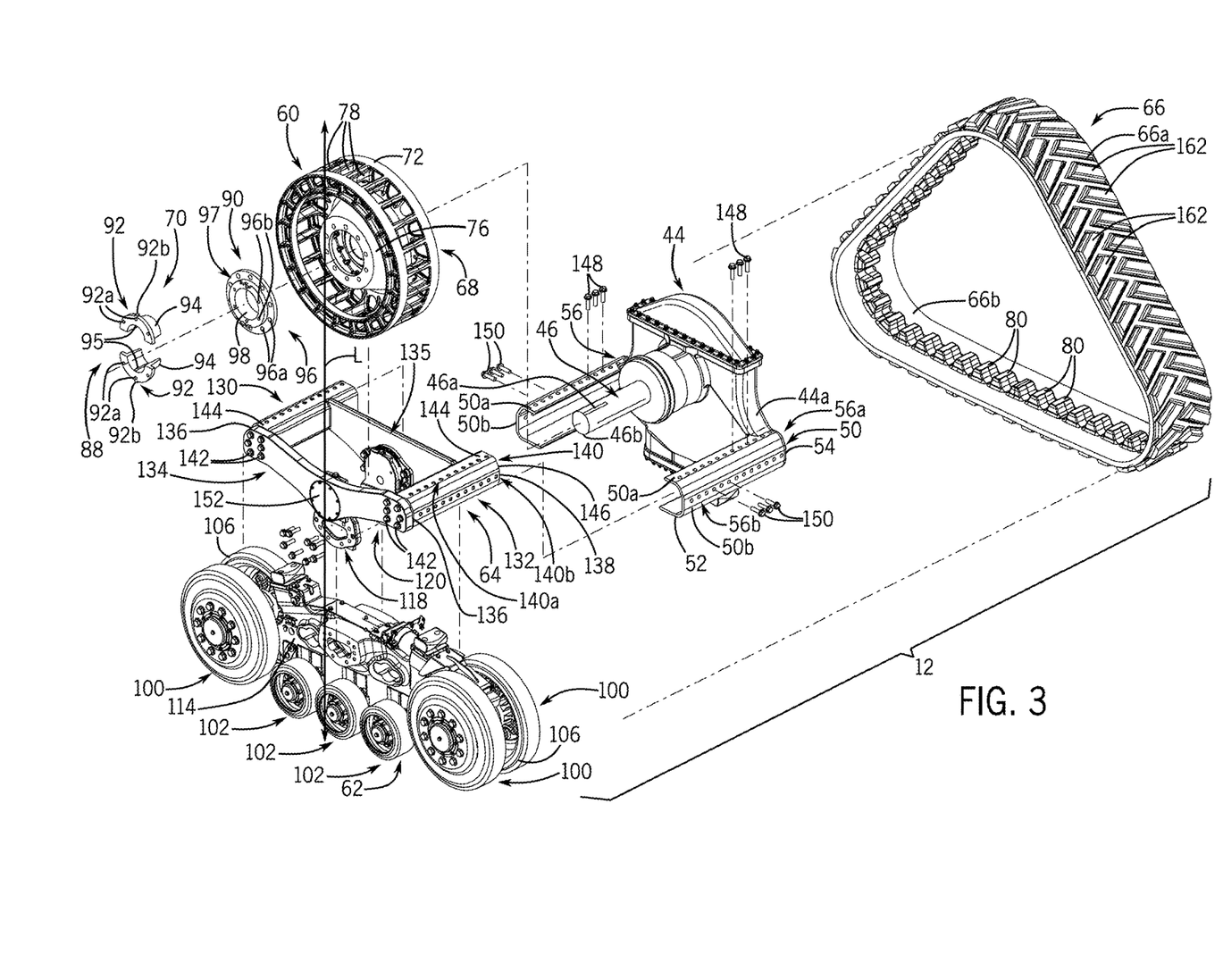
FIG. 3 is a partially exploded view of one of the variable tread width track systems of FIG. 2.

In this example, with additional reference to FIG. 3, the differential gear case 44 includes a pair of channels 50 for each one of the pair of track systems 12. The pair of channels 50 each extend outwardly from a housing 44a of the differential gear case 44, and generally extend along an axis that is substantially parallel to a longitudinal axis L of the track system 12. Each of the channels 50 includes a first end 52 opposite a second end 54. As will be discussed further herein, the respective track system 12 is movable in the channels 50 from the first end 52 to the second end 54, and to various positions in-between. Generally, the channels 50 are substantially C-shaped to slidably receive a portion of the respective track system 12. The channels 50 also define a plurality of bores 56 from the first end 52 to the second end 54. The plurality of bores 56 receive one or more mechanical fasteners, such as bolts, screws, pins, etc. to couple the portion of the track system 12 to the respective channel 50. In this example, a first row 56a of the plurality of bores 56 are defined along a first sidewall 50a of each of the channels 50, and a second row 56b of the plurality of bores 56 are defined along a second sidewall 50b of each of the channels 50. A third row of a plurality of bores can also be defined along a third sidewall of each of the channels 50, if desired, and moreover, each of the channels 50 can define a single row of the plurality of bores 56. Generally, each bore 56 of the plurality of bores 56 are substantially equidistantly spaced to enable multiple tread width positions for the tractor 10.

Each of the track systems 12 are slidably coupled to the differential gear case 44 via respective pairs of channels 50. As the plurality of track systems 12 are substantially similar, for ease of description, a single track system 12 will be discussed in detail herein, with the understanding that the following discussion is applicable to the other track systems 12 associated with the tractor 10. With continued reference to FIGS. 2 and 3, the track system 12 includes a drive wheel assembly 60, an undercarriage assembly 62, a saddle assembly 64 and a track 66.

In this example, the drive wheel assembly 60 is coupled to the axle shaft 46. The drive wheel assembly 60 is movable relative to the axle shaft 46 to adjust the tread width of the tractor 10. Generally, the drive wheel assembly 60 is releasably coupled to the axle shaft 46 such that the drive wheel assembly 60 is movable along the axle shaft 46 to a position and orientation for a desired tread width, and then the drive wheel assembly 60 is fixedly coupled to the axle shaft 46. With reference to FIG. 3, the drive wheel assembly 60 includes a drive wheel 68 and a hub pilot 70.

Figure 5:
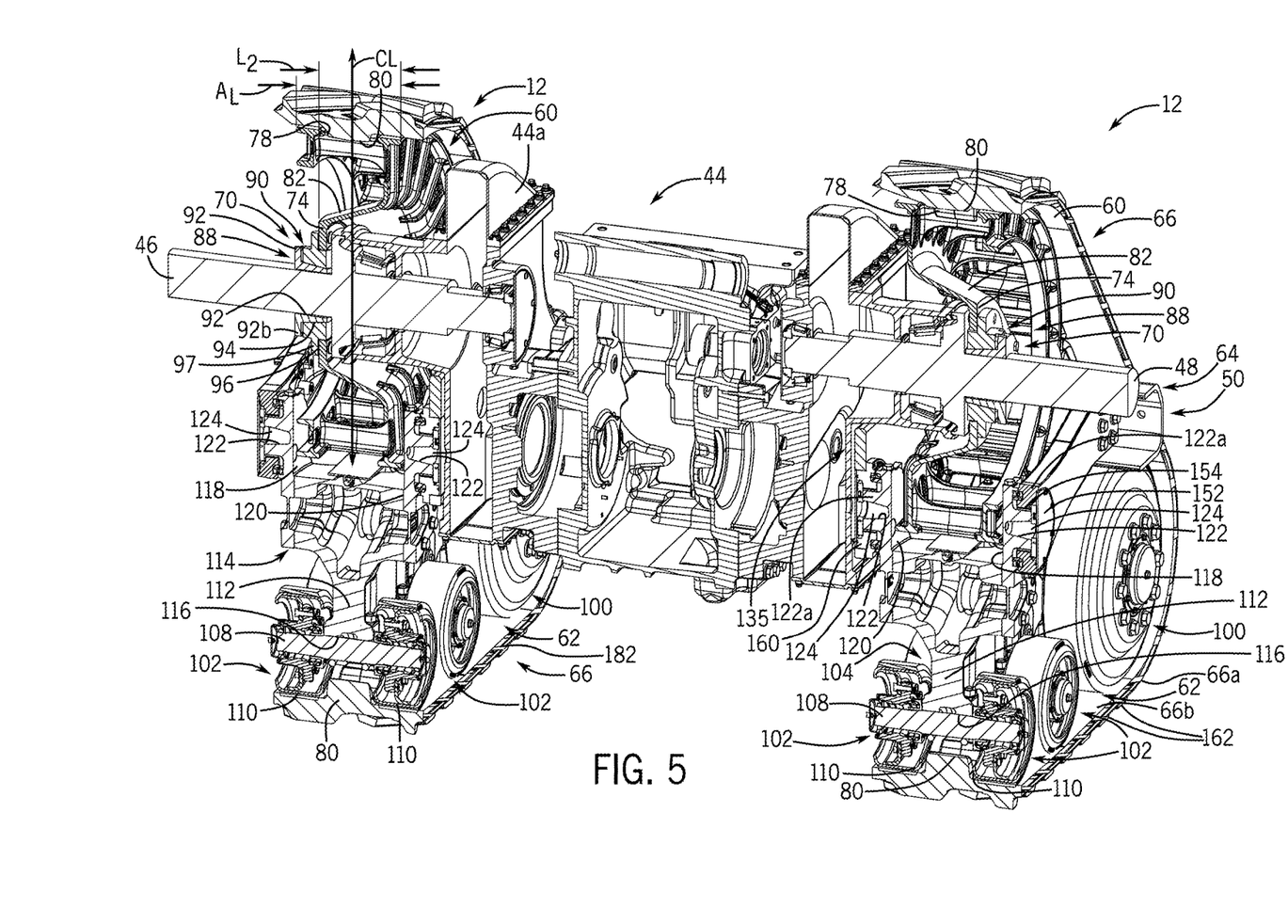
FIG. 5 is a cross-sectional view of the pair of variable tread width track systems of FIG. 2, taken along line 5-5 of FIG. 2.

The drive wheel 68 is annular, and defines an outer circumference 72 and an inner circumference 74, which are interconnected by a drive wheel hub 76. Generally, the drive wheel 68 is composed of a metal or metal alloy, which is cast as one integral piece. It will be understood, however, that the drive wheel 68 can be composed of multiple pieces that are welded or otherwise fastened together. The outer circumference 72 defines a plurality of track guides 78 substantially continuously about a perimeter. In this example, the plurality of track guides 78 comprises a plurality of slots, which are spaced substantially evenly about the perimeter of the outer circumference 72 to transfer torque from the drive wheel 68 to the track 66. In this example, each of the plurality of track guides 78 have a substantially rectangular shape, however, the plurality of track guides 78 can have any desired shape to cooperate with the track 66. With reference to FIG. 5, the plurality of track guides 78 each receive a respective one of a plurality of teeth 80 of the track 66 to drive the track 66 with the drive wheel 68.

The drive wheel hub 76 couples the outer circumference 72 to the inner circumference 74. The drive wheel hub 76 is annular, and includes a sidewall 82. The sidewall 82 extends from an end of the plurality of track guides 78 to the inner circumference 74. The sidewall 82 has a length $L_2$ that is at least equal to or greater than half an axial length $A_L$ of the drive wheel 68. In this example, the length $L_2$ is greater than about two-thirds the axial length $A_L$. The length $L_2$ of the sidewall 82 is such that the inner circumference 74 is axially offset from a centerline $C_L$ of the drive wheel 68. The offset of the inner circumference 74 enables the positioning of the drive wheel 68 at various tread widths, as will be discussed in detail herein.

The inner circumference 74 is coupled to the hub pilot 70. In this example, the inner circumference 74 defines a plurality of bores 84, which receive a plurality of mechanical fasteners, to couple the inner circumference 74 of the drive wheel 68 to the hub pilot 70. It should be noted that while the hub pilot 70 is illustrated and described herein as being coupled to the drive wheel 68 via one or more mechanical fasteners, any suitable technique can be employed to couple the drive wheel 68 to the hub pilot 70, and further, the hub pilot 70 can be integrally formed with the inner circumference of the drive wheel 68, if desired. A throughbore 86 is defined at the inner circumference 74, which is sized to receive the axle shaft 46 therethrough.

The hub pilot 70 is coupled to the axle shaft 46 so as to be driven by the axle shaft 46. Generally, the hub pilot 70 is formed from a metal or metal alloy. With reference to FIG. 3, the hub pilot 70 includes a collar 88 and a hub body 90. In this example, the collar 88 comprises a first section 88a and a second section 88b that cooperate to fixedly couple the collar 88 to the axle shaft 46. Each of the first section 88a and the second section 88b include an annular coupling flange 92 and an arcuate extension 94. Each of the annular coupling flanges 92 define a plurality of bores 92a about a perimeter of respective the annular coupling flange 92. The annular coupling flange 92 also includes a locking tab 92b, which extends outwardly from the perimeter of the respective annular coupling flange 92. The locking tab 92b engages a portion of the hub body 90 to couple the hub body 90 to the collar 88 at a desired orientation.

Figure 5A:
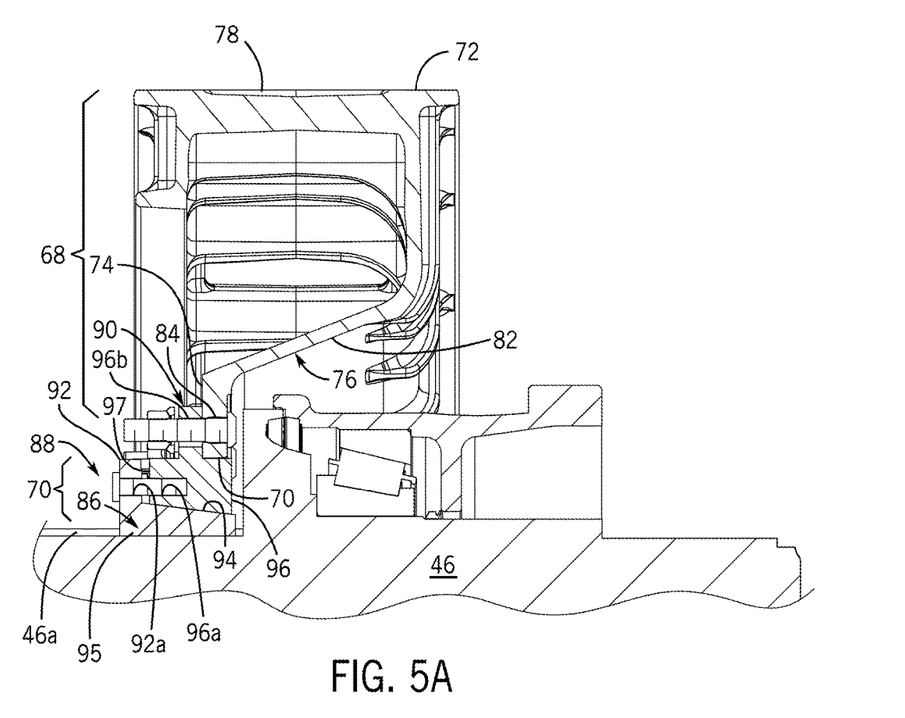
FIG. 5A is a cross-sectional view of a portion of a drive wheel, a hub pilot and a an axle shaft of the variable tread width track system of FIG. 2, taken along line 5A-5A of FIG. 2.

Each of the arcuate extensions 94 cooperate to define a conical engagement surface that engages a portion of the axle shaft 46. In one example, each of the arcuate extensions 94 includes a keyed portion 95, which cooperates with a first keyed portion 46a and a second keyed portion 46b of the axle shaft 46 (FIG. 5A). The engagement between the keyed portion 95, the first keyed portion 46a and the second keyed portion 46b of the axle shaft 46 cooperates with the hub body 90 to fixedly couple the collar 88 to the axle shaft 46. Generally, the arcuate extensions 94 are sized and shaped to receive the axle shaft 46 therethrough and to clamp onto the respective first and second keyed portions 46a, 46b of the axle shaft 46. An exterior surface of the arcuate extension 94 is substantially smooth, and receives the hub body 90.

The hub body 90 has a first side 96 opposite a second side 97, and defines a bore 98 that extends through the hub body 90 from the first side 96 to the second side 97 to enable the axle shaft 46 to pass through the hub body 90. In this example, with the drive wheel 68 in a first orientation, the second side 97 of the hub body 90 is coupled to the collar 88 and the first side 96 of the hub body 90 is coupled to the drive wheel 68. With the drive wheel 68 in a second orientation, the second side 97 of the hub body 90 is coupled to the drive wheel 68 and the first side 96 of the hub body 90 is coupled to the collar 88. A first plurality of bores 96a and a second plurality of bores 96b are defined from the first side 96 to the second side 97. The first plurality of bores 96a are coaxially aligned with the plurality of bores 92a of the annular coupling flange 92 when the hub body 90 is coupled to the collar 88 to receive a plurality of mechanical fasteners to couple the hub body 90 to the collar 88 (FIG. 5A). The coupling of the hub body 90 to the collar 88 via the plurality of mechanical fasteners draws the arcuate extensions 94 together, thereby clamping the collar 88, and thus, the hub body 90 to the axle shaft 46. The second plurality of bores 96b are spaced radially apart from the first plurality of bores 96a, and cooperate with the plurality of bores 84 of the inner circumference 74 to receive a plurality of mechanical fasteners to couple the drive wheel 68 to the hub pilot 70. The first side 96 and the second side 97 of the hub body 90 defines a pair of slots 97a, which receive the locking tab 92b of the annular coupling flanges 92 to prevent relative rotation between the hub body 90 and the collar 88. It should be noted that the use of the hub pilot 70 is merely exemplary, as any suitable technique can be employed to couple the drive wheel 68 to the axle shafts 46, 48, respectively.

With reference to FIG. 2, the undercarriage assembly 62 is movably or pivotally coupled to the saddle assembly 64 and the differential gear case 44. The undercarriage assembly 62, however, is not coupled to the drive wheel 68. Thus, the drive wheel 68 is movable on the axle shaft 46 independently of the undercarriage assembly 62. The undercarriage assembly 62 includes a plurality of first idler wheels 100 and a plurality of bogey or second idler wheels 102, which are each supported for rotation relative to a undercarriage frame 104. In this example, the undercarriage assembly 62 includes two pairs of first idler wheels 100, and three pairs of second idler wheels 102. Each of the first idler wheels 100 and second idler wheels 102 cooperate to guide the track 66 along the ground as it is driven by the drive wheel 68. It should be noted that this configuration of idler wheels 100, 102 is merely exemplary, as any number and arrangement of idler wheels may be employed.

In this example, the first idler wheels 100 are coupled together in pairs via a respective shaft (not shown), such that each pair of interconnected first idler wheels 100 rotate substantially in unison. The first idler wheels 100 can be coupled to the shaft via one or more mechanical fasteners, such as bolts, etc. It should be noted, however, that the pairs of the first idler wheels 100 can be integrally formed with a respective shaft, if desired. The shaft is supported for rotation by the undercarriage frame 104, and is rotatable relative to the undercarriage frame 104. Generally, with reference to FIG. 3, the pairs of first idler wheels 100 are coupled together such that the teeth 80 of the track 66 are each received in a spaced defined between adjacent first idler wheels 100 to guide the track 66 along the ground. The first idler wheels 100 can include a lip 106 on an interior surface, which is sized to contact a portion of each of the teeth 80 of the track 66 as the track 66 moves.

With reference to FIG. 5, the second idler wheels 102 are coupled together in pairs via a respective shaft 108, such that each pair of interconnected second idler wheels 102 rotate substantially in unison. The second idler wheels 102 can be coupled to the shaft 108 via one or more mechanical fasteners, such as bolts, etc. It should be noted, however, that the pairs of the second idler wheels 102 can be integrally formed with a respective shaft 108, if desired. The shaft 108 is supported for rotation by the undercarriage frame 104, and is rotatable relative to the undercarriage frame 104. Generally, the pairs of second idler wheels 102 are coupled together such that the teeth 80 of the track 66 are each received in a spaced defined between adjacent second idler wheels 102 to guide the track 66 along the ground. The second idler wheels 102 can include a lip 110, which is sized to contact a portion of each of the teeth 80 of the track 66 as the track 66 moves.

Figure 4:
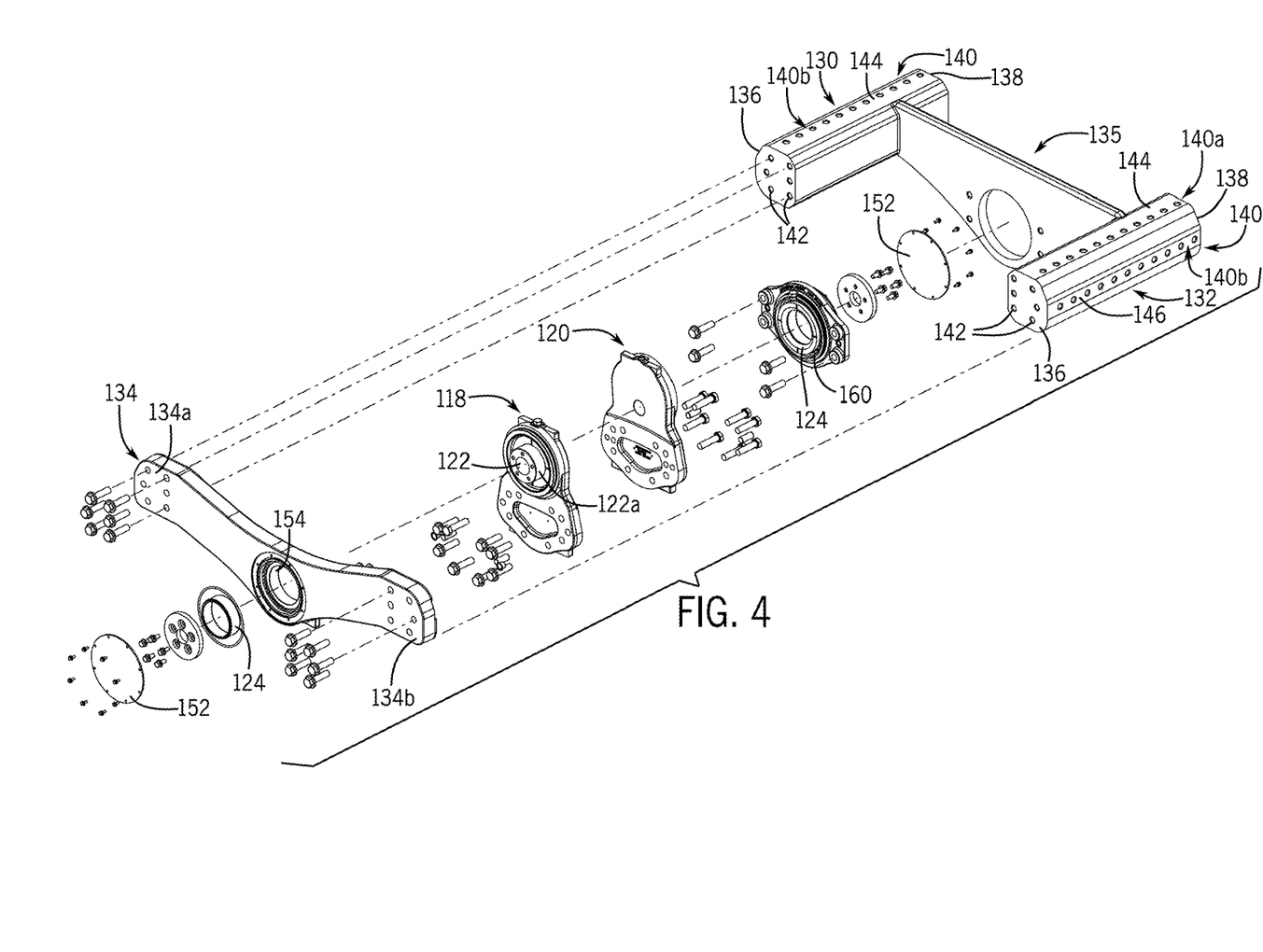
FIG. 4 is an exploded view of the saddle assembly of one of the variable tread width track systems of FIG. 2.

The undercarriage frame 104 includes a plurality of supports 112 that extend from a main frame 114. Each of the plurality of supports 112 defines an opening 116 that receives a respective shaft, such as shaft 108, to support the rotation of the respective pairs of first idler wheels 100 and second idler wheels 102 relative to the undercarriage frame 104. With reference to FIG. 2, the main frame 114 extends along an axis substantially perpendicular to the longitudinal axis L. The main frame 114 movably or pivotally couples the undercarriage assembly 62 to the saddle assembly 64. With reference back to FIG. 4, the main frame 114 includes a first pivot arm 118 and a second pivot arm 120. The first pivot arm 118 and the second pivot arm 120 are each coupled to the main frame 114 to extend upwardly from the main frame 114, and are spaced apart such that a portion of the drive wheel 68 is received within a space defined by the first pivot arm 118 and the second pivot arm 120, however, the drive wheel 68 does not contact the first pivot arm 118 or the second pivot arm 120. With reference to FIG. 4, each of the first pivot arm 118 and the second pivot arm 120 include a pivot journal 122 for the undercarriage assembly 62. Each pivot journal 122 receives a respective bushing 124 for pivotally coupling the undercarriage assembly 62 to the saddle assembly 64. In this example, the pivot journal 122 of the first pivot arm 118 receives the bushing 124 that projects from a first portion of the saddle assembly 64, and the pivot journal 122 of the second pivot arm 120 receives the bushing 124 that projects from a second portion of the saddle assembly 64. Generally, the pivot journal 122 is defined as a cylindrical feature that extends outwardly from each of the first pivot arm 118 and the second pivot arm 120. The pivotal mounting of the undercarriage assembly 62 to the saddle assembly 64 enables the undercarriage assembly 62 to move over uneven terrain. It should be noted that the first pivot arm 118 and the second pivot arm 120 can also include one or more bushings, bearings, etc. to assist in the pivotal mounting of the undercarriage assembly 62 to the saddle assembly 64.

With reference to FIG. 5, the saddle assembly 64 is pivotally coupled to the undercarriage assembly 62, and is movably or slidably coupled to a respective pair of the channels 50 of the differential gear case 44. As will be discussed, the saddle assembly 64 cooperates with the pair of channels 50 of the differential gear case 44 to enable the adjustment of the tread width of the tractor 10. In one example, with reference to FIG. 4, the saddle assembly 64 includes a first rail 130, a second rail 132, an interconnecting member 134 and a pivot support member 135. At least a portion of the drive wheel 68 is received within an area bounded by the first rail 130, the second rail 132, the interconnecting member 134 and the pivot support member 135 (FIG. 3). Generally, the first rail 130, the second rail 132, the interconnecting member 134 and the pivot support member 135 are each composed of a metal or metal alloy, which is stamped, machined, cast to form the first rail 130, the second rail 132, the interconnecting member 134 and the pivot support member 135. It should be noted that while the first rail 130, the second rail 132 and the pivot support member 135 are described and illustrated herein as comprising an integrally formed component, one or more of the first rail 130, the second rail 132 and the pivot support member 135 can be discretely formed and coupled together via fasteners, welding, etc., if desired. Further, the first rail 130, the second rail 132, the interconnecting member 134 and the pivot support member 135 can all be integrally formed, via casting, for example, if desired. Moreover, it should be noted that while the saddle assembly 64 and the differential gear case 44 (FIG. 3) are illustrated and described herein as including two channels and two rails for each track system 12, the track system 12 can be movable to adjust a tread width of the tractor 10 on more than two channels and two rails, as desired.

The first rail 130 is spaced apart from the second rail 132 by the pivot support member 135. The first rail 130 and the second rail 132 are substantially similar, and are symmetric about an axis that is substantially parallel to the longitudinal axis L of the track system 12 (FIG. 3). The first rail 130 and the second rail 132 are each substantially tubular, and each generally has a substantially square cross-section. In this example, each of the first rail 130 and the second rail 132 are substantially hollow, however, the first rail 130 and/or the second rail 132 can be solid. The first rail 130 and the second rail 132 can each include one or more chamfered surfaces that cooperate with one or more rounded corners of the channels 50 (FIG. 3) to assist in positioning the first rail 130 and/or the second rail 132 within the respective one of the channels 50. Each of the first rail 130 and the second rail 132 include a first end 136, a second end 138 and a plurality of bores 140.

In this example, the first end 136 of each of the first rail 130 and the second rail 132 is coupled to the interconnecting member 134, and the second end 138 is coupled to the respective one of the channels 50 (FIG. 3). The first end 136 of the first rail 130 and the second rail 132 defines a plurality of coupling bores 142, which receive a respective one of a plurality of mechanical fasteners, such as bolts, to couple the first end 136 of each of the first rail 130 and the second rail 132 to the interconnecting member 134. It should be noted, however, that the first end 136 of each of the first rail 130 and the second rail 132 can be coupled to the interconnecting member 134 via any suitable technique, such as adhesives, welding, etc. The second end 138 of each of the first rail 130 and the second rail 132 is slidably received within the respective channel 50 (FIG. 3).

The plurality of bores 140 extend along the first rail 130 and the second rail 132 generally from the first end 136 to the second end 138. In one example, the plurality of bores 140 comprises a first row 140a of the plurality of bores 140 and a second row 140b of the plurality of bores 140. The first row 140a of the plurality of bores 140 are defined along a first sidewall 144 of each of the first rail 130 and the second rail 132, and the second row 140b of the plurality of bores 140 are defined along a second sidewall 146. With reference to FIG. 3, the first row 140a plurality of bores 140 of each of the first rail 130 and the second rail 132 are positioned along the first sidewall 144 so as to be coaxially aligned with the first row 56a of the plurality of bores 56 of the respective channel 50 to enable the receipt of a plurality of mechanical fasteners 148 to couple the first rail 130 and the second rail 132 to the respective channel 50. The second row 140b of the plurality of bores 140 of each of the first rail 130 and the second rail 132 are positioned along the second sidewall 146 so as to be coaxially aligned with the second row 56b of the plurality of bores 56 of the respective channel 50 to enable the receipt of a plurality of mechanical fasteners 150 to couple the first rail 130 and the second rail 132 to the respective channel 50. It should be noted that the number of the plurality of bores 140 and the plurality of bores 56 illustrated is merely exemplary, as the first rail 130 and the second rail 132 can have any number of bores, which receive any number of mechanical fasteners, to enable the first rail 130 and the second rail 132 to be coupled to the respective channels 50. Moreover, the plurality of bores 140 and the plurality of bores 56 may be defined at various positions or spacings to enable any number of predefined tread width settings for the tractor 10.

Figure 6:
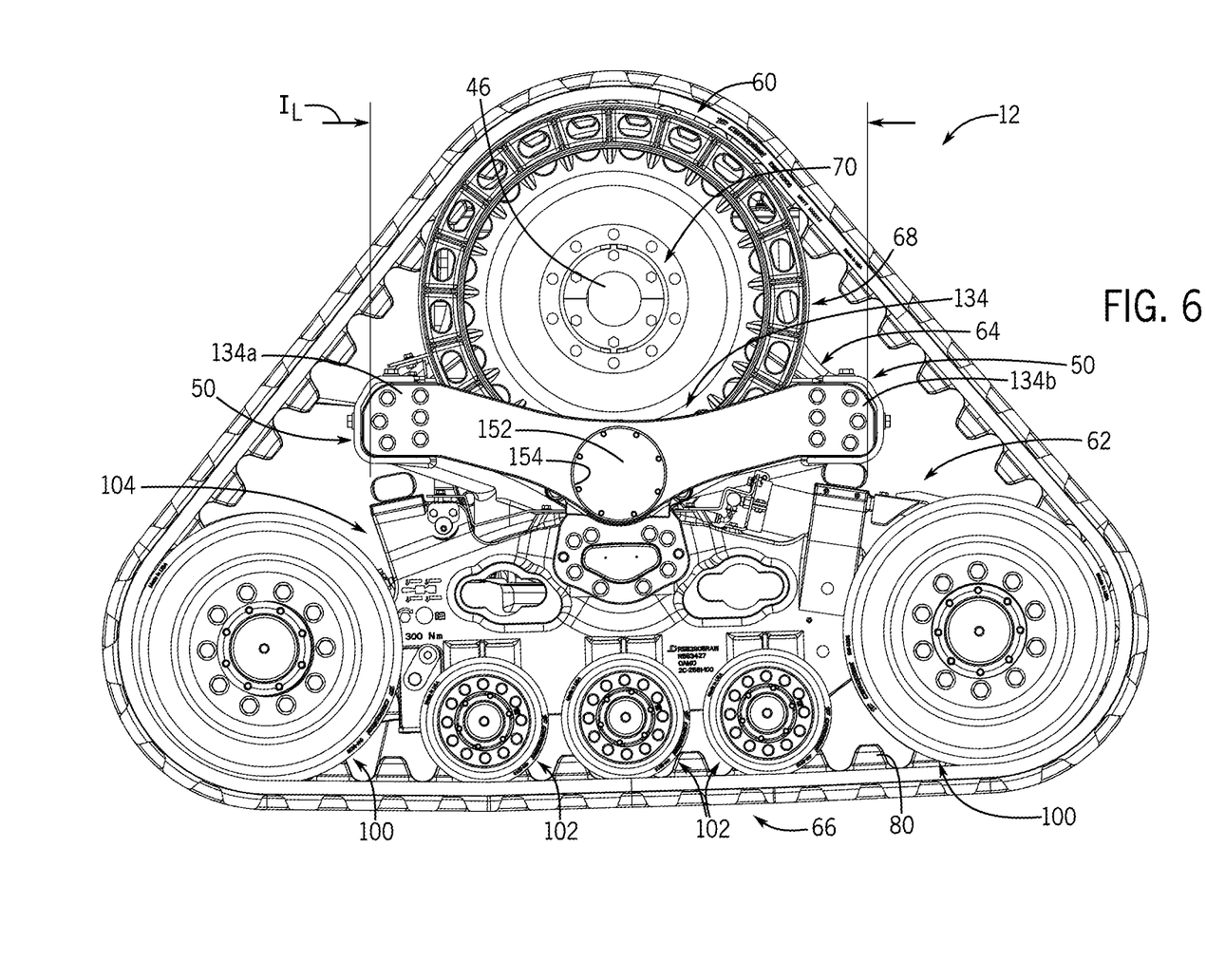
FIG. 6 is a side view of one of the pair of variable tread width track systems of FIG. 2.

With reference to FIG. 6, the interconnecting member 134 couples the first rail 130 to the second rail 132, and generally has a length $I_L$, which is greater than a diameter of the drive wheel 68. By having the length $I_L$ greater than the diameter of the drive wheel 68, the first rail 130 and the second rail 132 are movable within the channels 50 on either side of the drive wheel 68 without contacting the drive wheel 68. In this example, the interconnecting member 134 has a flattened V-shape, however, the interconnecting member 134 can have any desired shape. The interconnecting member 134 has a first end 134a coupled to the first rail 130, and a second end 134b coupled to the second rail 132. Generally, the interconnecting member 134 can provide a graspable portion or handle for an operator, in order to allow the operator to easily move the saddle assembly 64 to the desired tread width. The interconnecting member 134 includes a cover 152 that encloses a bore 154 defined near a mid-section of the interconnecting member 134. Generally, the cover 152 is coupled to the interconnecting member 134 via one or more mechanical fasteners, for example. With reference to FIG. 5, the cover 152 is coupled to the bushing 124 of the saddle assembly 64 to retain the bushing 124 within the saddle assembly 64. In this example, the bore 154 is sized such that a portion of the pivot journal 122 of the undercarriage assembly 62 is received within the interconnecting member 134 to couple the bushing 124 and the undercarriage assembly 62 to the saddle assembly 64.

With reference to FIG. 3, the pivot support member 135 is coupled to the first rail 130 and the second rail 132 adjacent to or near the second end 138. In this example, the pivot support member 135 is coupled to the first rail 130 and the second rail 132 so as to be spaced apart from the second end 138. Generally, the pivot support member 135 is coupled near the second end 138 to be spaced apart from the periphery of the drive wheel 68. The pivot support member 135 extends along an axis that is substantially perpendicular to the longitudinal axis L of the track system 12 (FIG. 3). With reference to FIG. 5, the pivot support member 135 includes a bore 160 and the bushing 124. The bore 160 surrounds the bushing 124 and receives an exterior circumference of the pivot journal 122 of the second pivot arm 120 to pivotally couple the undercarriage assembly 62 to the saddle assembly 64. With reference to FIG. 4, the pivot support member 135 includes the cover 152 that encloses a bore defined near a mid-section of the pivot support member 135. Generally, the cover 152 is coupled to the pivot support member 135 via one or more mechanical fasteners, for example. The cover 152 is coupled to the bushing 124 of the saddle assembly 64 to retain the bushing 124 within the saddle assembly 64. It should be noted that the pivotal coupling between the first pivot arm 118 and the interconnecting member 134 and the pivotal coupling between the second pivot arm 120 and the pivot support member 135 is merely exemplary, as any suitable arrangement can be employed to pivotally couple the undercarriage assembly 62 to the saddle assembly 64. Moreover, the first pivot arm 118, the second pivot arm 120 and the associated pivot journal 122 and bushing 124 may be substantially identical.

With reference to FIG. 3, the track 66 is continuous, and is received about a perimeter of the drive wheel 68 and the undercarriage assembly 62. Generally, the track 66 is tensioned about the drive wheel 68 and the undercarriage assembly 62. The track 66 has an exterior surface 66a, and an interior surface 66b. In this example, the track 66 is composed of a polymeric material; however, the track 66 can be composed of a metal or metal alloy. The exterior surface 66a includes a plurality of projections or treads 162, which project from the exterior surface 66a to engage the terrain over which the tractor 10 travels. The interior surface 66b includes the plurality of teeth 80. The plurality of teeth 80 extend outwardly from the interior surface 66b to engage the drive wheel 68, the first idler wheels 100 and the second idler wheels 102 to move or drive the track 66 about the perimeter of the drive wheel 68 and the undercarriage assembly 62.

With reference to FIG. 3, in order to assemble the track system 12, in one example, with each of the shafts, including shafts 108, coupled to the main frame 114, the second idler wheels 102 are coupled to the respective shafts 108 in pairs. The first idler wheels 100 are coupled to the respective shafts (not shown) in pairs. With reference to FIG. 4, the first pivot arm 118 is coupled to the interconnecting member 134 such that the pivot journal 122 is rotatable within the bushing 124 of the interconnecting member 134. With the bushing 124 coupled to the pivot support member 135, the pivot journal 122 of the second pivot arm 120 is coupled to the bushing 124 of the pivot support member 135 to pivotally couple the undercarriage assembly 62 to the saddle assembly 64. The first end 136 of each of the first rail 130 and the second rail 132 is coupled to the interconnecting member 134, via one or more mechanical fasteners.

With reference to FIG. 3, with the drive wheel 68 formed with the sidewall 82, the hub body 90 of the hub pilot 70 is coupled to the drive wheel 68. With the differential gear case 44 assembled, the collar 88 of the hub pilot 70 is coupled to the axle shaft 46, and the hub body 90 is coupled to the collar 88 to couple the drive wheel assembly 60 to the axle shaft 46. With reference to FIG. 3, the first rail 130 and the second rail 132 are positioned within a respective one of the channels 50, and the plurality of mechanical fasteners 148 and the plurality of mechanical fasteners 150 are inserted into the respective plurality of bores 140 and the plurality of bores 56 to couple the saddle assembly 64 to the differential gear case 44. The track 66 is coupled about the drive wheel assembly 60 and the undercarriage assembly 62, such that the teeth 80 are received in the track guides 78 and between the pairs of first idler wheels 100 and the pairs of second idler wheels 102.

Figure 7:
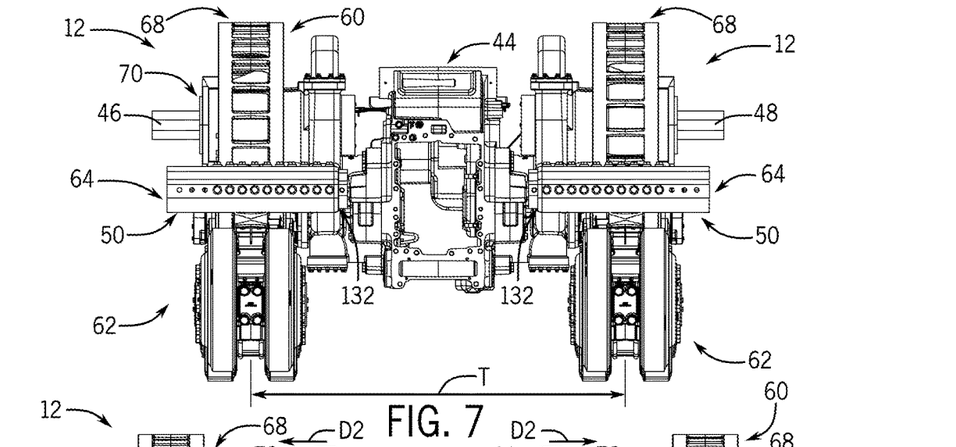
FIG. 7 is a schematic view of the pair of variable tread width track systems of FIG. 2, showing a first tread width defined by the pair of variable tread width track systems with the respective tracks omitted for clarity.
Figure 8:
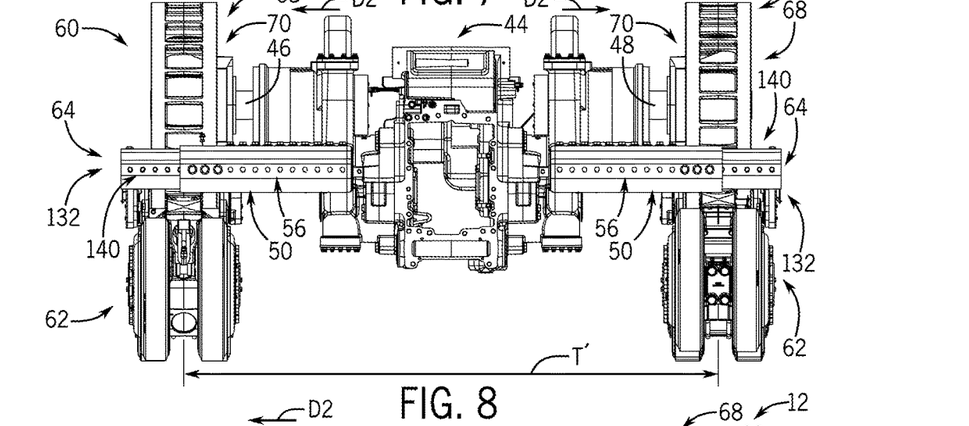
FIG. 8 is a schematic view of the pair of variable tread width track systems of FIG. 2, showing a second tread width defined by the pair of variable tread width track systems with the respective tracks omitted for clarity.
Figure 9:
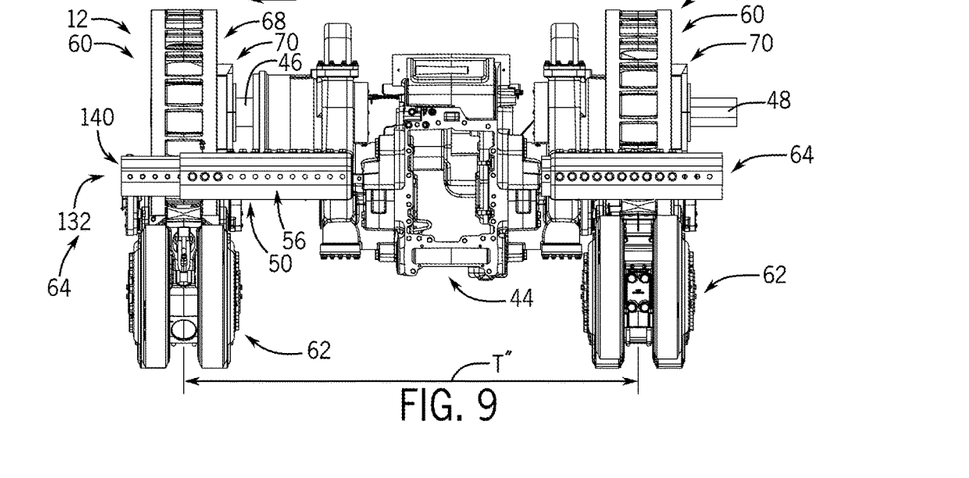
FIG. 9 is a schematic view of the pair of variable tread width track systems of FIG. 2, showing a third tread width defined by the pair of variable tread width track systems with the respective tracks omitted for clarity.

With reference to FIGS. 7-9, the track systems 12 are shown with track 66 removed for clarity. In FIG. 7, a first tread width T is shown. In FIG. 7, each of the drive wheels 68 are coupled to the first side 96 of the hub body 90 of the hub pilot 70. With reference to FIG. 8, in order to adjust the tread width T to a second tread width T', in one example, with the track 66 un-tensioned from the track system 12, the plurality of mechanical fasteners 148 and the plurality of mechanical fasteners 150 are removed from the first rail 130 and the respective channel 50; and the second rail 132 and the respective channel 50. In this example, the hub pilot 70 is loosened, such that the drive wheel 68 may move or slide on the axle shaft 46. The saddle assembly 64 is moved in a respective direction D2 away from the differential gear case 44, such that the first rail 130 and the second rail 132 slide away from the differential gear case 44 in the respective channels 50. As the undercarriage assembly 62 is coupled to the saddle assembly 64, the movement of the saddle assembly 64 moves the undercarriage assembly 62 in the direction D2. The movement of the saddle assembly 64 may result in a movement of the drive wheel 68 due to the track 66, but does not directly move the drive wheel 68 as the drive wheel 68 is not coupled to either of the saddle assembly 64 or the undercarriage assembly 62. In this example, the saddle assembly 64 is pulled in the direction D2 until the saddle assembly 64 is removed from the channels 50 and the drive wheel 68 is uncoupled from the respective axle shaft 46, 48. The drive wheel 68 is uncoupled from the hub body 90 of the hub pilot 70 and rotated 180 degrees or flipped, such that the drive wheel 68 is coupled to the second side 97 of the hub body 90 of the hub pilot 70 in the second orientation. Stated another way, the drive wheel 68 can be rotated such that the drive wheel 68 is coupled to the respective axle shaft 46, 48 so as to be adjacent to the differential gear case 44 as shown in FIG. 7, or the drive wheel 68 can be orientated away from the differential gear case 44 such that the sidewall 82 is spaced apart from the differential gear case 44. In other words, the drive wheel 68 is movable between the first orientation, in which the sidewall 82 is facing toward from the differential gear case 44 and the drive wheel 68 is coupled to the first side 96 of the hub body 90; and the second orientation, in which the sidewall 82 is facing away from the differential gear case 44 and the drive wheel 68 is coupled to the second side 97 of the hub body 90. Thus, the drive wheel 68 is coupled to the hub pilot 70 that couples the drive wheel 68 to the axle shaft 46, and in the first orientation, the drive wheel 68 is adjacent to the differential gear case 44 along an axis of the axle shaft 46; and in the second orientation, the drive wheel 68 is spaced apart from the differential gear case 44 along the axis of the axle shaft 46.

One the drive wheel 68 is coupled to the axle shaft 46 via the hub pilot 70, the saddle assembly 64 can be positioned to define the tread width T'. Once the first rail 130 and the second rail 132 are positioned at the desired orientation within the channels 50, the plurality of mechanical fasteners 148 and the plurality of mechanical fasteners 150 are inserted into the respective plurality of bores 140 of the first rail 130 and the respective plurality of bores 56 of the respective channel 50; and the respective plurality of bores 140 of the second rail 132 and the respective plurality of bores 56 of the respective channel 50. The track 66 is re-tensioned about the drive wheel 68 and the undercarriage assembly 62. This process can be repeated for the track system 12 on the opposite axle shaft 48 to define the tread width T' for the tractor 10. Thus, the offset of the hub pilot 70 from the center line $C_L$ of the drive wheel 68 enables for a greater tread width (FIG. 5).

With reference to FIG. 9, in order to adjust the tread width T to a third tread width T'', in one example, with the track 66 un-tensioned about a single one of the track systems 12, the plurality of mechanical fasteners 148 and the plurality of mechanical fasteners 150 are removed from the first rail 130 and the respective channel 50; and the second rail 132 and the respective channel 50 of the single track system 12. In this example, the hub pilot 70 is loosened, such that the drive wheel 68 may move or slide on the axle shaft 46. The saddle assembly 64 of this track system 12 is pulled in the direction D2 away from the differential gear case 44, such that the first rail 130 and the second rail 132 slide away from the differential gear case 44 in the respective channels 50 until the saddle assembly 64 is removed from the channels 50. As the undercarriage assembly 62 is coupled to the saddle assembly 64, the movement of the saddle assembly 64 moves the undercarriage assembly 62 in the direction D2, but does not move the drive wheel 68.

Once the first rail 130 and the second rail 132 are positioned at the desired orientation within the channels 50, the plurality of mechanical fasteners 148 and the plurality of mechanical fasteners 150 are inserted into the respective plurality of bores 140 of the first rail 130 and the respective plurality of bores 56 of the respective channel 50; and the respective plurality of bores 140 of the second rail 132 and the respective plurality of bores 56 of the respective channel 50. The drive wheel 68 is uncoupled from the respective axle shaft 46. The drive wheel 68 is rotated 180 degrees or flipped, such that the sidewall 82 is facing away from the differential gear case 44. Stated another way, the drive wheel 68 can be rotated such that the drive wheel 68 is coupled to the second side 97 of the hub body 90 in the reverse orientation. Once the drive wheel 68 is positioned on the axle shaft 46 in the desired orientation, in this example, the reverse orientation in which the sidewall 82 faces away from the differential gear case 44, the hub pilot 70 is fixedly coupled to the axle shaft 46 to rotate with the axle shaft 46. Once the drive wheel 68 is coupled to the axle shaft 46, the saddle assembly 64 is coupled to the channels 50 and positioned at the third tread width T''. The plurality of mechanical fasteners 148 and the plurality of mechanical fasteners 150 are inserted into the respective plurality of bores 140 of the first rail 130 and the respective plurality of bores 56 of the respective channel 50; and the respective plurality of bores 140 of the second rail 132 and the respective plurality of bores 56 of the respective channel 50. The track 66 is re-tensioned about the drive wheel 68 and the undercarriage assembly 62.

Thus, as shown and described with regard to FIG. 9, the track systems 12 are each independently adjustable to define the tread width for the tractor 10, and the track systems 12 need not be adjusted to the same position or have the same drive wheel 68 orientation.

Moreover, one or more of the saddle assemblies 64 can be moved relative to the channels 50 in the direction D2 and re-coupled to the channels 50 via the mechanical fasteners 148, 150 at a predefined tread width without uncoupling the drive wheel 68 from the respective axle shaft 46, 48. Stated another way, with the track 66 un-tensioned and the mechanical fasteners 148, 150 removed, the respective saddle assembly 64 can be moved in the direction D2 without removing the saddle assembly 64 from the channels 50. The movement of the saddle assembly 64 in the channels 50 directly moves the undercarriage assembly 62, as the undercarriage assembly 62 is coupled to the saddle assembly 64. The movement of the saddle assembly 64 may also indirectly move the drive wheel 68 via the movement of the track 66 with the undercarriage assembly 62. Generally, in this example, prior to movement of the saddle assembly 64, the hub pilot 70 can be loosened from the respective axle shaft 46, 48 such that the drive wheel 68 may move indirectly with the movement of the saddle assembly 64.

In the above examples, the first tread width T is about 72 inches, the second tread width T' is about 120 inches, and the third tread width T" is about 100 inches. It should be noted that these values are merely exemplary. It will be appreciated that the tread widths T-T" illustrated in FIGS. 7-9 are merely examples, as any number of tread widths are achievable with the saddle assembly 64 of the present disclosure. For example, the channels 50, the first rail 130 and the second rail 132 can be configured to enable tread spacing or tread width adjustment in about four inch increments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A variable tread width system for a track work vehicle, the track work vehicle having a differential gear case and at least one axle shaft, the variable tread width system comprising:
   a drive wheel removably coupled to the axle shaft to receive a torque to drive the track, the drive wheel being movable relative to the axle shaft between a first orientation and a second orientation;
   a saddle assembly coupled to the differential gear case, the saddle assembly including at least one rail movable relative to the differential gear case and the saddle assembly being movable independently of the drive wheel; and
   a hub pilot coupling the drive wheel to the axle shaft, the drive wheel being coupled to a first side of the hub pilot in the first orientation and to a second side of the hub pilot in the second orientation;
   wherein the drive wheel cooperates with the saddle assembly to define a plurality of tread widths for the track work vehicle.

2. The system of claim 1, wherein, in the first orientation, the drive wheel is coupled to the first side of the hub pilot so as to be adjacent to the differential gear case.

3. The system of claim 2, wherein, in the second orientation, the hub pilot is coupled to the second side of the hub pilot so as to be spaced apart from the differential gear case along the axis of the axle shaft.

4. The system of claim 2, wherein the drive wheel has a drive wheel hub, which is coupled to the hub pilot such that the hub pilot is offset from a centerline of the drive wheel.

5. The system of claim 1, wherein the saddle assembly includes a first rail spaced apart from a second rail and the differential gear case includes a first channel that slidably receives the first rail and a second channel that slidably receives the second rail.

6. The system of claim 5, wherein the saddle assembly further comprises an interconnecting member and a support member; and
   wherein each of the first rail and the second rail have a first end coupled to the interconnecting member and a second end, with the support member coupled adjacent to the second end.

7. The system of claim 6, wherein at least a portion of the drive wheel is received within an area bounded by the first rail, the second rail, the interconnecting member and the support member.

8. The system of claim 1, further comprising an undercarriage assembly that guides the track driven by the drive wheel; and
   wherein the undercarriage assembly is pivotally coupled to the saddle assembly.

9. A variable tread width system for a track work vehicle, the track work vehicle having a differential gear case and at least one axle shaft, the variable tread width system comprising:
   a drive wheel removably coupled to the axle shaft to receive a torque to drive the track, the drive wheel being movable between a first orientation relative to the axle shaft to define at least a first tread width and a second orientation relative to the axle shaft to define at least a second tread width;
   a hub pilot coupling the drive wheel to the axle shaft, the drive wheel being coupled to a first side of the hub pilot in the first orientation and to a second side of the hub pilot in the second orientation;
   a saddle assembly coupled to the differential gear case, the saddle assembly including at least one rail movable relative to the differential gear case to adjust a tread width of the work vehicle, and the saddle assembly being movable independently of the drive wheel; and
   an undercarriage assembly that guides the track about the drive wheel, the undercarriage assembly being pivotally mounted to the saddle assembly such that movement of the saddle assembly relative to the differential gear case moves the undercarriage assembly.

10. The system of claim 9, wherein, in the first orientation, the drive wheel is coupled to the first side of the hub pilot so as to be adjacent to the differential gear case.

11. The system of claim 10, wherein, in the second orientation, the hub pilot is coupled to the second side of the hub pilot so as to be spaced apart from the differential gear case along the axis of the axle shaft.

12. The system of claim 10, wherein the drive wheel has a drive wheel hub, which is coupled to the hub pilot such that the hub pilot is offset from a centerline of the drive wheel.

13. The system of claim 9, wherein the saddle assembly includes a first rail spaced apart from a second rail and the differential gear case includes a first channel that slidably receives the first rail and a second channel that slidably receives the second rail.

14. The system of claim 13, wherein the saddle assembly further comprises an interconnecting member and a support member; and
   wherein each of the first rail and the second rail have a first end coupled to the interconnecting member and a second end, with the support member coupled adjacent to the second end and at least a portion of the drive wheel is received within an area bounded by the first rail, the second rail, the interconnecting member and the support member.

15. A variable tread width system for a track work vehicle, the track work vehicle having a differential gear case and at least one axle shaft, the variable tread width system comprising:
   a drive wheel coupled to the axle shaft to receive a torque to drive the track, the drive wheel being movable between a first orientation relative to the axle shaft and a reverse orientation relative to the axle shaft; and
   a saddle assembly coupled to the differential gear case, the saddle assembly including a first rail spaced apart from a second rail, each of the first rail and the second rail being movable relative to the differential gear case, and the saddle assembly being movable independently of the drive wheel,
   wherein a movement of the saddle assembly relative to the differential gear case and a movement of the drive wheel relative to the axle shaft cooperates to define a plurality of tread widths for the track work vehicle
   wherein the drive wheel is coupled to a hub pilot that couples the drive wheel to the axle shaft; and
   wherein, in the first orientation, the drive wheel is coupled to a first side of the hub pilot so as to be adjacent to the differential gear case, and in the second orientation, the drive wheel coupled to a second side of the hub pilot so as to be spaced apart from the differential gear case along the axis of the axle shaft.

16. The system of claim 15, wherein the drive wheel has a drive wheel hub, which is coupled to the hub pilot such that the hub pilot is offset from a centerline of the drive wheel.

17. The system of claim 15, wherein the differential gear case includes a first channel that slidably receives the first rail and a second channel that slidably receives the second rail.

18. The system of claim 15, wherein the saddle assembly further comprises an interconnecting member and a support member each coupled to the first rail and the second rail; and
   wherein the variable tread width system further comprises an undercarriage assembly that guides the track driven by the drive wheel and is pivotally coupled to the interconnecting member and the support member of the saddle assembly.

\* \* \* \* \*